Nov. 23, 1937.  A. ANDREAS  2,099,834
PACKAGE FILLING MACHINE
Filed March 16, 1932  3 Sheets-Sheet 2
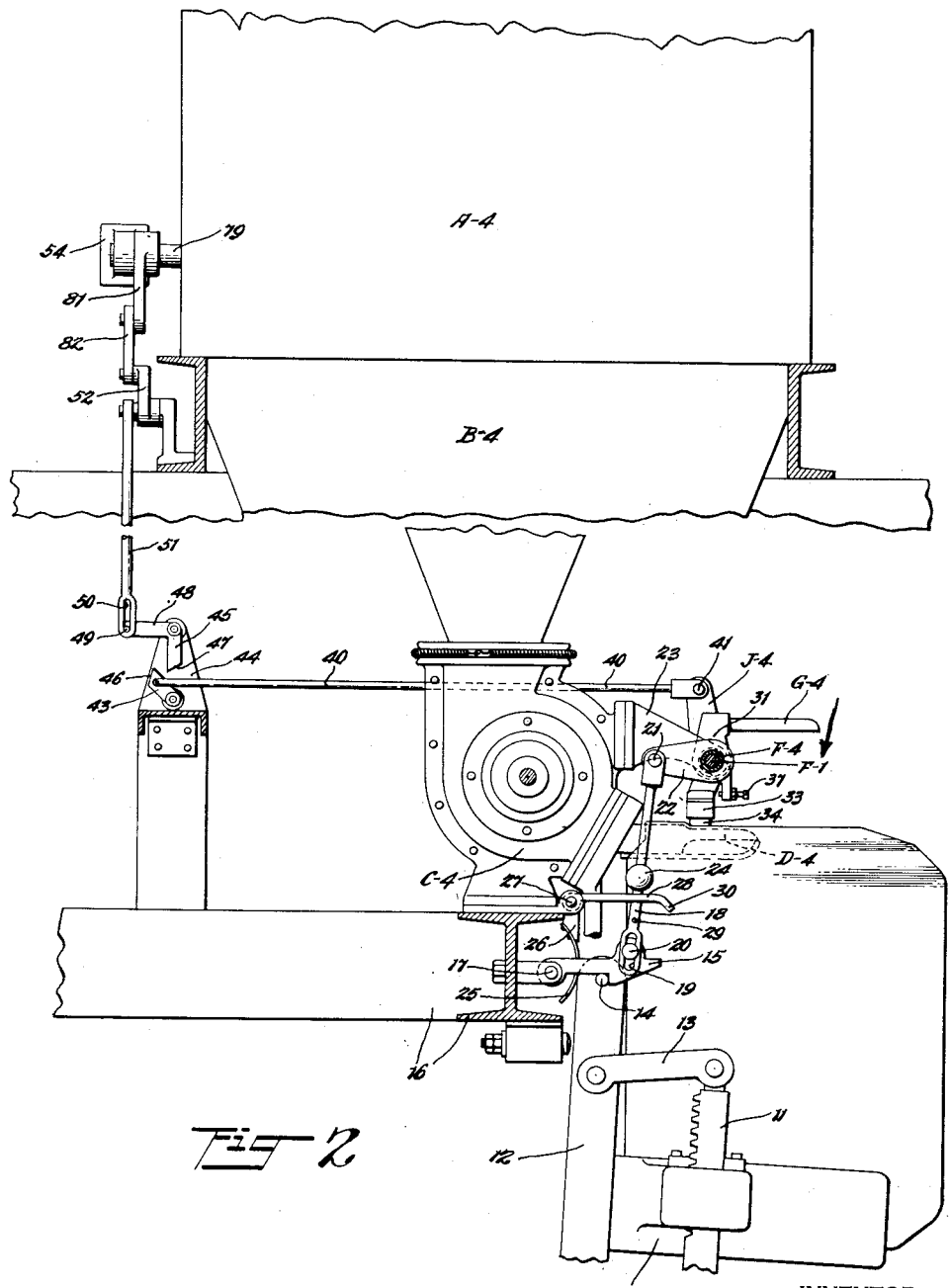
INVENTOR
Arno Andreas
BY
E.C. Sanborn
ATTORNEY

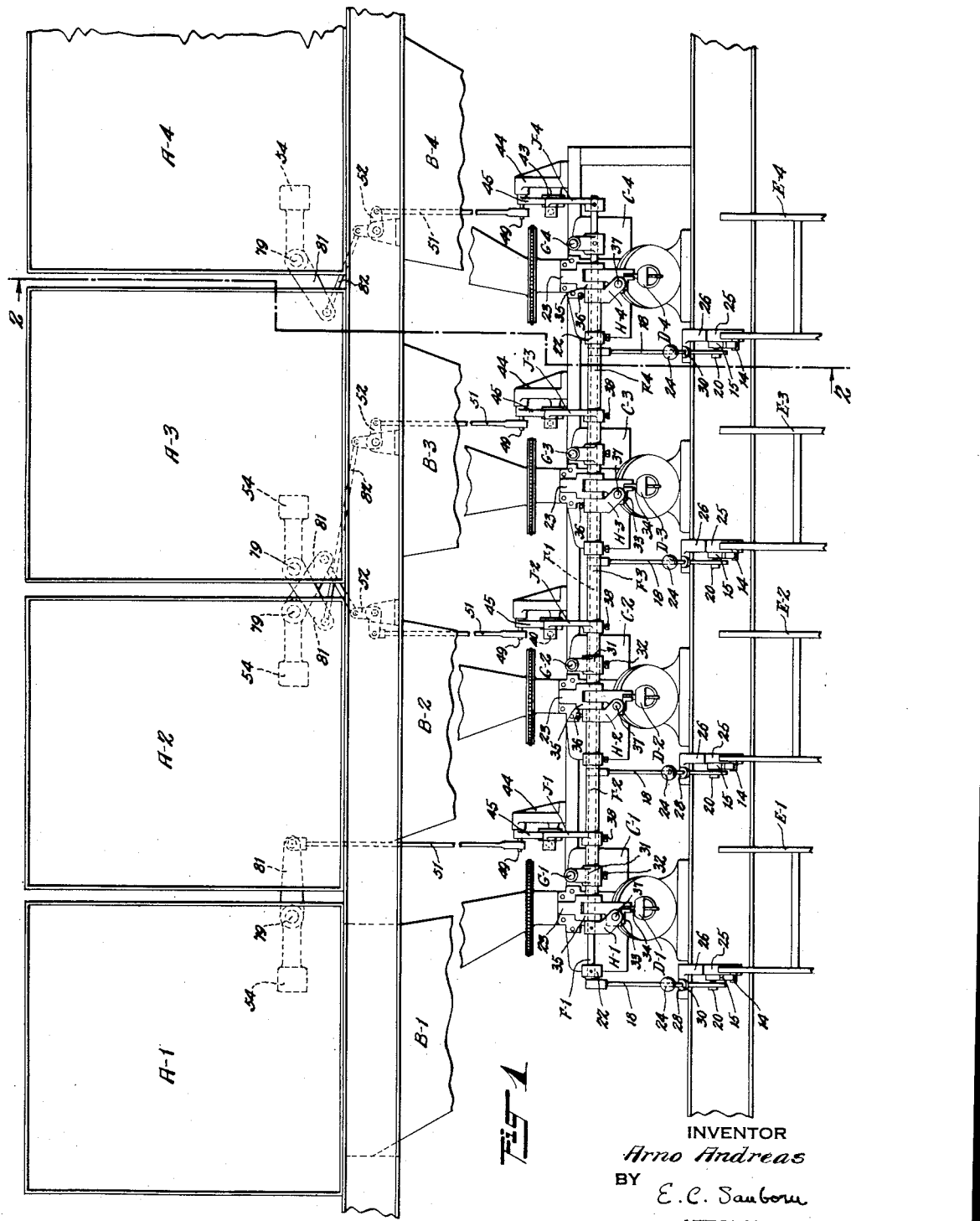

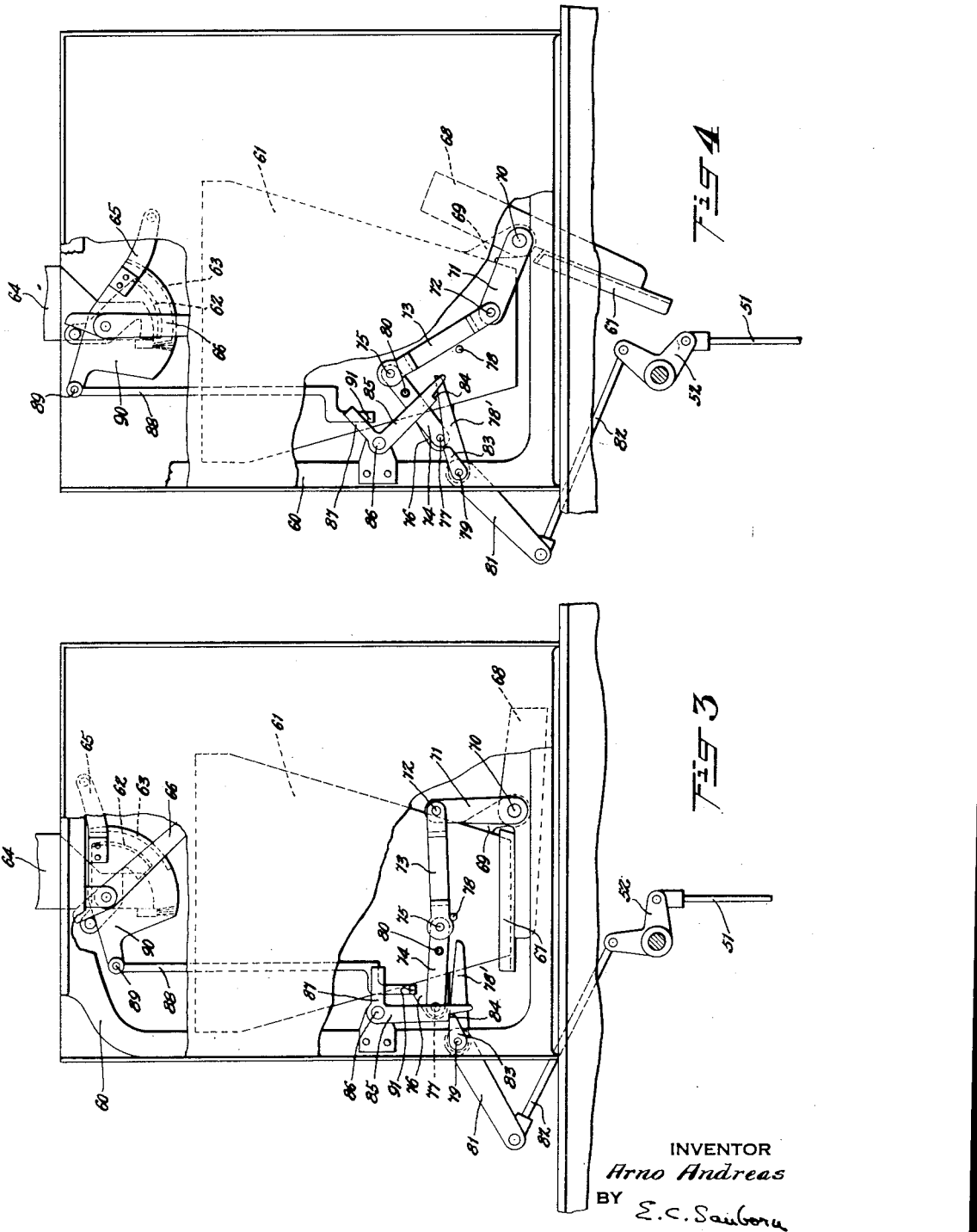

Patented Nov. 23, 1937

2,099,834

UNITED STATES PATENT OFFICE 2,099,834

PACKAGE FILLING MACHINE

Arno Andreas, Munster, Germany, assignor to Bagpak, Inc., New York, N. Y., a corporation of Delaware Application March 16, 1932, Serial No. 599,150

5 Claims. (Cl. 226—48)

This invention relates to package filling machines, and more particularly to improvements in machines which first weigh a quantity of divided material, for instance, cement, and then deliver it to the package. For example, there is shown in my copending application Serial No. 419,986, filed January 10, 1930, apparatus of this character comprising a plurality of units each including an automatic weighing machine and means for filling packages with the weighed material, all the units preferably being arranged for control by a single operator, and coordinated so that as a bag in one unit is discharged from the machine, the weighed material in a unit on which an empty bag has just been placed is by the same operation released from the weighing machine for delivery to the bag. An object of the invention hence resides in the provision, especially in combination with other features of such a machine, of simple and effective mechanism for positively preventing the discharge of weighed material in a given unit before full weight had been reached. Another object of the invention resides in the provision of improved control mechanism for such a machine, which mechanism requires few manipulations on the part of the operator, and at the same time is neither complicated and expensive to manufacture nor involved in operation. Other objects and advantages of the invention will be in part apparent and in part pointed out in connection with the following detailed description of a preferred embodiment, reference being had to the accompanying drawings, wherein:

Fig. 1 is a front elevation of a bag filling machine in accordance with the invention, partly broken away.

Fig. 2 is an enlarged vertical section of one unit in such a machine, taken on the line 2—2 of Fig. 1, and partly broken away.

Fig. 3 is a detailed view, partly diagrammatic, showing certain features of a weighing mechanism suitable for employment in such a bag filling machine, and the parts being in the positions they occupy while the weighing receptacle is being filled.

Fig. 4 is a view similar to Fig. 3, but showing the parts in position for discharge of weighed material from the weighing receptacle.

Turning first to Fig. 1, there is shown a plurality of bag filling units each including weighing mechanism, means to convey weighed material into the bags, and means for supporting the bags in filling position and for discharging them from the machine. The weighing machines in this view are shown diagrammatically at A—1, A—2, A—3 and A—4, there being four units illustrated, though it will be appreciated that the invention is applicable to constructions in which other numbers of units are employed.

Below the respective weighing mechanisms, there are positioned hoppers B—1, B—2, B—3, and B—4 for receiving the weighed material from the several weighing machines, and delivering it to turbines at C—1, C—2, C—3 and C—4, which, in turn, deliver the material through spouts D—1, D—2, D—3 and D—4 into bags supported on cradles E—1, E—2, E—3 and E—4. These cradles are preferably, though not necessarily, of the type described and claimed in my copending application, Serial No. 570,330, filed October 22, 1931. However, the present invention is not limited to the specific construction of the cradles, as the features covered herein may be combined with other bag supports. As shown, each cradle comprises a bag chair 10, adapted to support the bottom of a bag and suitably secured to generally upright arms 11 which may be pivoted at their lower ends on jogging mechanism (not shown). Other arms 12 for controlling the tilting of arms 11 may be pivoted in any convenient manner at their lower ends and connected to arms 11 through pivoted links 13. In this manner arms 11 and 12 are adapted to tilt forwardly for discharging bags from the machine. The cradle is preferably so constructed that the center of gravity of the bag when on the bag chair is forward of the arms 11, so that the cradle tends to tilt forward by gravity particularly when there is material in the bag, on account of the moment acting about the pivots of arms 11. For maintaining the cradle in upright position while a bag is being filled, arm 12 is shown as having a pin 14 for engagement by a latch member 15 which is pivoted to stationary frame 16, as at 17.

For releasing the latch 15, there is shown a rod 18 having a slot 19 for cooperation with a pin 20 on the latch. The rod 18 of each unit is pivoted at its upper end as at 21, to an arm 22 secured to a respective one of a series of sleeves F—2, F—3 and F—4, in the case of units Nos. 2, 3 and 4, and to shaft F—1 in the case of unit No. 1. The shaft F—1 is shown journalled in suitable brackets 23, which are secured to a stationary part of the machine, sleeves F—2, F—3 and F—4 being journalled on said shaft between adjacent brackets. When a sleeve, or the shaft, is rotated in a clockwise direction, Fig. 2, it will raise the rod 18, thus releasing the latch from engagement with the bag cradle and permitting the bag to be discharged from the machine. For returning these parts to their positions shown in Fig. 2, the rod 18 may be made sufficiently heavy, or have a weight 24 carried therewith, so that the rod 18 tends always to assume its lowermost position. Although the cradle is adapted, upon release of latch 15, to tilt forwardly through the action of gravity to discharge bags containing material, it may be desirable to impart an initial boost to the cradle to overcome friction of the parts and possible sticking of the bag valve on the spout. For this purpose, a booster member 25 is shown adapted to contract with upright arm 12 to push the upper end of the latter forwardly. The booster may preferably be made of resilient material such as steel, and secured to arm 26 of a bell crank lever pivoted as at 27 on the stationary frame. The rod 18 may pass through an elongated slot (not shown) in the other arm 28 of the bell crank and has a pin 29 for engaging said arm upon upward movement of the rod, preferably just after the latch 15 has been released. The arm 28 may be bent as at 30 for engaging pin 29 to prevent the booster from being swung outwardly and upwardly so far that it will catch on upright 12 when the latter swings back to its position shown in Fig. 2.

Secured to each of the sleeves F—2, F—3 and F—4 there is a handle G—1, G—2 and G—3 respectively, while a handle G—4 is secured to a shaft F—1 at its end opposite to that at which the latch releasing mechanism for the cradle in No. 1 unit is secured. Each of these handles may be secured through an arm 31 and set screw 32, and preferably extends, for convenience of operation, forwardly and generally horizontally in its normal position as shown in Fig. 1.

Each unit of the bag filling machine is shown as including a bag clamp 33 preferably having an element 34 of resilient material for engaging the bag and maintaining it on the spout, as best shown in Fig. 2. Each bag clamp may be pivoted on shaft F—1 between forked portions 35 of brackets 23, and is preferably constructed so that it tends to swing forwardly to clamping position because of its own weight, and is free to swing in the opposite direction while a bag is being placed on the spout. A bag being in place, the clamp swings forward and may be further urged to clamping position by reason of the impact on the bag caused by entering material impinging on the walls of the same. The operator may, of course, manually pull the clamp forward to clamping position.

For releasing the bag clamps, there are shown in the several units arms H—1, H—2, H—3 and H—4, the first of which may be secured to the shaft F—1, while the others may be secured to sleeves F—2, F—3 and F—4 through set screws 36. Each of the arms is preferably provided with an adjustable member, such as a set screw 37, arranged to contact with a corresponding bag clamp for effecting release of the same. By means of this construction, lost motion may be provided for, in order that upon operating the handles G the latches 15 may be released in proper coordination with, and preferably just subsequent to, the release of the bag clamps, and so that desired adjustments may be made. At the same time, bags may be placed on the spouts and clamped independently of operation of the clamp releasing mechanism.

Arms J—1, J—2, J—3 and J—4 are shown secured respectively to the sleeves F—2, F—3 and F—4, and to the shaft F—1, as by set screws 38, and adapted through mechanism of the character described hereinafter to cause discharge of weighed material from the weighing machines upon operation of the handles G. Thus actuation of each handle G will release the cradle latch and bag clamp in one unit and swing arm J to effect discharge of weighed material from another. The operation of the machine will be further described below. Each arm J is shown pivoted as at 41 to a connecting rod 40, pivoted in turn, to a lever 43 pivotally mounted on a stationary member 44 of the frame of the machine. This lever 43 is adapted to contact with arm 45 of a bell crank also pivoted on stationary member 44. The lever 43 and the arm 45 of the bell crank are shown provided, respectively, with inclined faces 46 and 47, so constructed and arranged that as the lever 46 is urged forwardly from its position shown in Fig. 2 it will strike the arm 45 of the bell crank and actuate the same in a counter-clockwise direction. The other arm 48 of the bell crank is shown provided with a pin 49 residing in slot 50 in the lower end of connecting rod 51, which may, where desired, be connected through direction reverse member 52 and suitable mechanism hereafter described, to means for controlling the discharge of material from the weighing machine. Provision is thus made for release of the weighed material through actuation of the handle in a given unit. Furthermore, these parts are preferably so constructed that upon operation of the handle G, the lever 43 will swing past the bell crank arm 45 to release the connecting rod 51 to permit the latter to return to its position shown in Fig. 2, even though the handle G is not promptly released. Upon subsequent release of the handle G, however, the handle, the lever 43, and the connections therebetween will be permitted to return to their positions shown in Fig. 2 without any effect upon the rod 51 and its connections to the weighing mechanism. The purpose of this arrangement will be better apparent following a description of one form of weighing mechanism which has been found particularly suitable for machines of the present character.

Referring now to Figs. 3 and 4, there is shown such a weighing mechanism including a frame 60 on which there is supported through any convenient balance arm (not shown) a weighing receptacle 61 located below feed valves 62 and 63 which control the flow of material from a hopper 64 into the receptacle. These valves are preferably of the full and dribble feed type, respectively, and may be controlled in any known manner through connections between arms 65 and 66 carried respectively by the valves 62 and 63, and the balance arm of the scales (not shown). It will be understood that these valves operate successively to reduce the feed considerably, and then stop it entirely just as full weight is reached in the weighing receptacle.

At the bottom of the receptacle 61 there is shown a valve 67 pivoted thereon through arm 69 and pivot pin 70. This valve may be counterweighted as at 68 to aid in returning it to closed position. For locking the valve in closed position while the receptacle is being filled, the valve 67 may have an arm 71 secured thereto and pivoted as at 72 to toggle link 73, which in turn is pivoted at one end to the end of toggle link 74, as at 75. This toggle link 74 is shown pivoted at 77, at its other end, to arm 76 secured to the weighing receptacle 61. A pin 78 on the receptacle prevents the links 73 and 74 from breaking downwardly beyond locking position.

For breaking the toggle to permit the valve 67 to swing open by reason of the weight of the material in receptacle 61 an arm 78' is shown pivoted at 79 on frame 60 and adapted to strike pin 80 on toggle arm 74. This arm 78' is shown secured to link 81, operable through a suitable connecting link 82 connected to the bell crank 52. A counterweight 54 may be suitably connected to arm 78' for returning this arm and related parts to normal position.

Secured to the arm 78' and adapted to swing therewith about pivot 79 there is shown a pawl 83 adapted to engage shoulder 84 formed on latch member 85. This latch member may be pivoted to the frame 60 as indicated at 86, and have an arm 87 for purposes hereafter mentioned. The latch member 85 is shown adapted to hang downwardly and normally be engaged by the pawl 83. When the parts are in the position shown in Fig. 3, it will be apparent that if a downward pull is imposed on the link 51, the arm 78' cannot swing upwardly to engage the pin 80 on link 74 of the toggle. In order to automatically withdraw the latch 85 from engagement with the pawl, and thus permit the breaking of the toggle, there is shown an arm 88 connected as at 89 through plate 90 to the dribble feed valve 63. It will be understood that when full weight of material is in the weighing receptacle, the latter will descend in order to trip suitable mechanism (not shown) and release the dribble feed valve 63 for closing. This valve may be suitably weighted so that it closes upon the release of a trip (not shown). As the valve 63 swings downwardly from its position shown in Fig. 3 to its position shown in Fig. 4, the arm 88 will be raised to its position shown in Fig. 4 and its foot 91 will be caused to engage the arm 87 on the latch member, swinging the latter upwardly, and hence the shoulder 84 outwardly from engagement with pawl 83, thus freeing the arm 78' for swinging upwardly to strike the pin on the toggle link 74, when the handle G is pulled down in the manner already described.

Although the operation and advantages of apparatus of the present character will be generally apparent from the preceding description, they may now be briefly mentioned. As indicated in my copending application Serial No. 419,986, the operator after placing an empty bag on spout D—1 and cradle E—1 will actuate handle G—1, thus causing discharge of weighed material from automatic scale mechanism A—1, assuming that material is being fed to the scales through suitable conveyor mechanism so that a predetermined quantity has already been weighed out. If the machine is being started there may not be a bag on unit 2, but if there is, that bag will be discharged, at least if it is filled with material. The operator will then proceed to unit 2, and having put a bag in place, will manipulate handle G—2, with the result that the flow of material into the bag from the weighing mechanism in unit 2 will be started, provided there is full weight in the weighing receptacle. The operator then proceeds similarly with respect to unit 3. Upon actuating handle G—4 in proper sequence, the bag in unit 1, which has now been filled, is discharged, and the operator returns to unit 1 and proceeds as before in the next cycle.

In operating apparatus of the character described, it will be understood that should the operator depress one of the handles G to effect discharge of a bag on the cradle controlled by that handle, when insufficient material is in the weighing receptacle the discharge valve of which is controlled by the same handle, the parts are so arranged that the handle may move far enough to release the bag clamp and cradle latch in the said unit, even though the rod 51 cannot be moved to effect opening of the discharge valve on the weighing receptacle. It will also be apparent that the one-way trip construction embodying the lever 43 and cooperating bell crank is not essential to permit this action of the handle, for sufficient lost motion may be provided, for instance, through an elongated pin and slot construction between arm 48 and rod 51. In this manner, danger of discharging weighed material before full weight in the weighing receptacle is positively prevented, while at the same time the discharge of filled bags is not interfered with. Moreover, should one weighing mechanism be out of commission, the other units of the machine may still be operated, so that the whole machine is not out of service when a single weighing mechanism is being cleaned or repaired. At the same time, the general sequence of operation may be the same as described.

The construction embodying the one-way trip device is particularly advantageous for the reason that upon depressing handle G, the bag cradle controlled thereby may take appreciable time to discharge the bag thereon. It, therefore, becomes desirable to hold the handle G depressed until the bag is discharged. While the handle G is held depressed, it is obvious that the discharge valve on the weighing receptacle, in certain prior constructions, will not be able to close, but at the same time the weighing receptacle having emptied, will be automatically rising to position where the balance arm effects opening of the full and dribble feed valves. Thus, it might happen that an additional amount of material would run through the weighing receptacle before the handle G is released with the result that too much material would be filled into one bag. The one-way trip mechanism described, or its mechanical equivalent, permits a handle G to be depressed for as long as is necessary to insure discharge of a bag, and at the same time, permits the automatic weighing machine to start on the next weighing operation, without fear that the discharge valve on the weighing receptacle will be held open for an excessive time.

The operations effected by actuation of a handle G preferably occur in the following sequence: the bag clamp may first be released, the cradle may then be unlatched and the booster may thereafter strike the cradle. All this is desirably accomplished by an initial movement of the handle, while the discharge of weighed material may be caused by a subsequent or continued movement of the handle.

It may be noted that a number of features disclosed herein are not claimed because they are claimed in my co-pending applications above referred to.

The terms and expressions which I have employed are used as terms of description and not of limitation, and I have no intention, in the use of such terms and expressions, of excluding any equivalents of the features shown and described, or portions thereof, but recognize that various modifications are possible within the scope of the invention claimed.

I claim:

1. In a package filling machine comprising a plurality of units each having means including a receptacle for weighing a quantity of material prior to placing it in the package, and means to discharge the package from the machine, an outlet valve on the receptacle, means to latch said valve prior to a predetermined weight of material being reached, means to deliver material from the outlet valve to the package, means for causing the package discharge means to function, and a connection between said last named means and said outlet valve for operating said outlet valve, said connection including sufficient lost motion to cause complete actuation of said package discharge means prior to actuation of said outlet valve.

2. In a package filling machine comprising a plurality of units each having means including a receptacle for weighing a quantity of material prior to placing it in the package, and means to discharge the package from the machine, an outlet valve on the receptacle, means to latch said valve prior to a predetermined weight of material being reached, means to deliver material from the outlet valve to the package, a manually operable handle, a connection between said handle and said package discharge means to initiate operation thereof; a connection between said handle and said outlet valve for initiating the opening of the same; the latter connection including sufficient lost motion to cause complete actuation of said package discharge means prior to initiation of the opening of said outlet valve.

3. In a package filling machine having a plurality of units each including weighing mechanism, means to support a package for filling and discharge, and means to guide material from the weighing mechanism into the package, a handle and means operable upon movement thereof to control the discharging action of the package support in one unit, and means controlled by said handle for effecting discharge of material to the guiding means and for releasing the weighing mechanism of another unit for a subsequent weighing operation irrespective of the return of said handle and continued operation of said means to control the discharging action of the package support in the first unit.

4. In a package filling machine, a plurality of units each including a receptacle for weighing and discharging materials, means to support and discharge a package, and means to guide weighed material from the receptacle to the package, means to prevent discharge of material from the receptacle irrespective of operation of the weighing mechanism, means for releasing said discharge preventing means, means engaging said releasing means for preventing operation of said releasing means until a predetermined amount of material has been weighed, and unitary means having an interconnection with said releasing means in one unit and an interconnection with the package supporting and discharging means in another unit for causing operation of both said package discharging means and said releasing means, the interconnection between said unitary means and said releasing means providing for complete actuation of said package discharging means prior to actuation of said releasing means.

5. In a package filling machine, a plurality of units each including a receptacle for weighing and discharging materials, means to support and discharge a package, and means to guide weighed material from the receptacle to the package, means to prevent discharge of material from the receptacle irrespective of operation of the weighing mechanism, means mounted independently of the weighing means for releasing said discharge preventing means, means engaging said releasing means for preventing operation of said releasing means until a predetermined amount of material has been weighed, a handle, interconnections including a lost motion device between said handle and said releasing means in one unit, and interconnections between said handle and said package supporting and discharging means in another unit, whereby operation of said handle causes operation of the releasing means, and package discharging action of the supporting means independent of the action of the releasing means.

ARNO ANDREAS.